United States Patent
Liao (10) Patent No.: US 11,303,430 B2
(45) Date of Patent: Apr. 12, 2022

(54) BYZANTINE FAULT TOLERANCE ALGORITHM-BASED BLOCKCHAIN CONSENSUS METHOD, APPARATUS, AND SYSTEM

(71) Applicant: ALIPAY (HANGZHOU) INFORMATION TECHNOLOGY CO., LTD., Zhejiang (CN)

(72) Inventor: Xiaojun Liao, Hangzhou (CN)

(73) Assignee: ALIPAY (HANGZHOU) INFORMATION TECHNOLOGY CO., LTD., Hangzhou (CN)

(*) Notice: Subject to any disclaimer, the term of this patent is extended or adjusted under 35 U.S.C. 154(b) by 0 days.

(21) Appl. No.: 17/351,812

(22) Filed: Jun. 18, 2021

(65) Prior Publication Data

US 2021/0314141 A1  Oct. 7, 2021

(30) Foreign Application Priority Data

Jul. 3, 2020 (CN) .......................... 202010630396.3

(51) Int. Cl.
    *H04L 9/06* (2006.01)
    *G06F 9/46* (2006.01)

(52) U.S. Cl.
    CPC .......... *H04L 9/0643* (2013.01); *G06F 9/466* (2013.01); *H04L 2209/38* (2013.01)

(58) Field of Classification Search
    CPC ... H04L 9/0634; H04L 9/466; H04L 2209/38; G06Q 20/3827; G06Q 40/04
    See application file for complete search history.

(56) References Cited

U.S. PATENT DOCUMENTS

| | | |
|---|---|---|
| 9,875,510 B1 | 1/2018 | Kasper |
| 10,102,265 B1 | 10/2018 | Madisetti et al. |
| 10,204,148 B2 | 2/2019 | Madisetti et al. |
| 10,320,569 B1 | 6/2019 | Wentz et al. |
| 10,417,217 B2 | 9/2019 | Pierce et al. |
| 10,573,178 B2 | 2/2020 | Nascimento et al. |
| 10,621,157 B2 | 4/2020 | Ventura et al. |

(Continued)

FOREIGN PATENT DOCUMENTS

| | | |
|---|---|---|
| CN | 111342971 A | 6/2020 |
| WO | 2020/000011 A1 | 1/2020 |

OTHER PUBLICATIONS

Extended European Search Report for European Application No. 21 182 477.6 dated Nov. 26, 2021.

(Continued)

*Primary Examiner* — Khoi V Le (57) ABSTRACT

A blockchain consensus method includes receiving, by a second consensus node of a blockchain, a consensus proposal initiated by a first consensus node of the blockchain, wherein the consensus proposal comprises a first proposal digest, and the first proposal digest is based on a transaction set that needs to be proposed and a first newest block hash maintained by the first consensus node; generating, by the second consensus node of the blockchain in response to the consensus proposal, a second proposal digest based on a second newest block hash maintained by the second consensus node and the transaction set; determining, by the second consensus node, whether the first proposal digest matches the second proposal digest.

20 Claims, 4 Drawing Sheets

(56) References Cited

U.S. PATENT DOCUMENTS

| | | |
|---|---|---|
| 10,789,590 B2 | 9/2020 | Tran et al. |
| 10,938,567 B2 * | 3/2021 | Martino ................ H04L 9/0894 |
| 2016/0224949 A1 | 8/2016 | Thomas et al. |
| 2018/0247191 A1 | 8/2018 | Katz et al. |
| 2019/0013943 A1 | 1/2019 | Maim |
| 2019/0028276 A1 * | 1/2019 | Pierce ................... G06Q 20/02 |
| 2019/0251199 A1 * | 8/2019 | Klianev ................ G06Q 40/04 |
| 2019/0386969 A1 | 12/2019 | Verzun et al. |
| 2020/0162264 A1 * | 5/2020 | Zamani ................ H04L 9/3297 |
| 2020/0274694 A1 | 8/2020 | Wood et al. |

OTHER PUBLICATIONS

Xiao et al., "A Survey of Distributed Consensus Protocols for Blockchain Networks", IEEE Communications Survey & Tutorials, IEEE, vol. 22, No. 2, Jan. 28, 2020.

* cited by examiner

Initiate, by a first consensus node of a consortium blockchain, a consensus proposal, where the consensus proposal includes a first proposal digest, the first proposal digest is generated based on a transaction set that needs to be proposed and a first newest block hash maintained by the first consensus node, the first newest block hash is a hash value of N blocks preceding a newest block in a distributed ledger maintained by the first consensus node, and N is a positive integer ~ 302

BYZANTINE FAULT TOLERANCE ALGORITHM-BASED BLOCKCHAIN CONSENSUS METHOD, APPARATUS, AND SYSTEM

CROSS REFERENCE TO RELATED APPLICATIONS

The present application claims priority to Chinese Patent Application No. 202010630396.3, filed with the CNIPA (China National Intellectual Property Administration) of the People's Republic of China on Jul. 3, 2020, the entire contents of which are incorporated herein by reference in the entirety.

TECHNICAL FIELD

This file relates to the field of computer technologies, and in particular, to a Byzantine fault tolerance algorithm-based blockchain consensus method, apparatus, and system.

BACKGROUND

A consensus protocol is used for allowing nodes distributed around the world in a blockchain to reach consensus. In an existing blockchain system, a packed transaction set may be copied through a consensus protocol to other nodes participating in consensus in a network, to ensure that most nodes have a consistent data copy. Consensus nodes execute transactions based on the consistent transaction set to generate a new block, continue to perform consensus on a next transaction set after the new block is generated, and repeat the foregoing procedure. The consensus protocol can ensure that most nodes have the same transaction set after consensus, but cannot ensure that a consistent block is generated based on an input of the same transaction set. Therefore, a more reliable solution is desirable.

SUMMARY

Embodiments of this specification provide a Byzantine fault tolerance algorithm-based blockchain consensus method, apparatus, and system, to ensure that nodes participating in consensus perform consensus based on consistent newest block(s).

Some embodiments of this specification further provide a Byzantine fault tolerance algorithm-based blockchain consensus method, including: initiating, by a first consensus node of a consortium blockchain, a consensus proposal, where the consensus proposal includes a first proposal digest, and the first proposal digest is generated based on a transaction set that needs to be proposed and a first newest block hash maintained by the first consensus node; generating, by a second consensus node of the consortium blockchain in response to the consensus proposal, a second proposal digest based on a second newest block hash maintained by the second consensus node and the transaction set; and skipping, by the second consensus node, consensus on the consensus proposal if the second consensus node determines that the first proposal digest does not match the second proposal digest, where the first newest block hash and the second newest block hash are hash values of N blocks preceding newest blocks in distributed ledgers respectively maintained by the first consensus node and the second consensus node, and N is a positive integer.

Some embodiments of this specification further provide a Byzantine fault tolerance algorithm-based blockchain consensus method, including: initiating, by a first consensus node of a consortium blockchain, a consensus proposal, where the consensus proposal includes a first proposal digest, and the first proposal digest is generated based on a transaction set that needs to be proposed and a first newest block hash maintained by the first consensus node; generating, by a second consensus node of the consortium blockchain in response to the consensus proposal, a second proposal digest based on a second newest block hash maintained by the second consensus node and the transaction set; and participating, by the second consensus node, in consensus on the consensus proposal if the second consensus node determines that the first proposal digest matches the second proposal digest, where the first newest block hash and the second newest block hash are hash values of N blocks preceding newest blocks in distributed ledgers respectively maintained by the first consensus node and the second consensus node, and N is a positive integer.

Some embodiments of this specification further provide a Byzantine fault tolerance algorithm-based blockchain consensus method, including: initiating, by a first consensus node of a consortium blockchain, a consensus proposal, where the consensus proposal includes a first proposal digest, and the first proposal digest is generated based on a transaction set that needs to be proposed and a first newest block hash maintained by the first consensus node, where the first newest block hash is a hash value of N blocks preceding a newest block in a distributed ledger maintained by the first consensus node, and N is a positive integer.

Some embodiments of this specification further provide a Byzantine fault tolerance algorithm-based blockchain consensus method, including: receiving, by a second consensus node of a consortium blockchain, a consensus proposal initiated by a first consensus node of the consortium blockchain, where the consensus proposal includes a first proposal digest, the first proposal digest is generated based on a first newest block hash maintained by the first consensus node and a transaction set that needs to be proposed, the first newest block hash is a hash value of N blocks preceding a newest block in a distributed ledger maintained by the first consensus node, and N is a positive integer; generating a second proposal digest in response to the consensus proposal based on a second newest block hash maintained by the second consensus node and the transaction set, where the second newest block hash is a hash value of N blocks preceding a newest block in a distributed ledger maintained by the second consensus node, and N is a positive integer; and skipping consensus on the consensus proposal if the second consensus node determines that the first proposal digest does not match the second proposal digest; or otherwise, participating in consensus on the consensus proposal.

Some embodiments of this specification further provide a Byzantine fault tolerance algorithm-based blockchain consensus system, including a first consensus node and a second consensus node, where the first consensus node is configured to initiate a consensus proposal, where the consensus proposal includes a first proposal digest, and the first proposal digest is generated based on a transaction set that needs to be proposed and a first newest block hash maintained by the first consensus node; the second consensus node is configured to generate, in response to the consensus proposal, a second proposal digest based on a second newest block hash maintained by the second consensus node and the transaction set; and skipping consensus on the consensus proposal if the second consensus node determines that the first proposal digest does not match the second proposal digest; or otherwise, participating in consensus on the consensus proposal, where the first newest block hash and the second newest block hash are hash values of N blocks preceding newest blocks in distributed ledgers respectively maintained by the first consensus node and the second consensus node, and N is a positive integer.

Some embodiments of this specification further provide a Byzantine fault tolerance algorithm-based blockchain consensus apparatus, including: a proposal module, configured to initiate a consensus proposal, where the consensus proposal includes a first proposal digest, and the first proposal digest is generated based on a transaction set that needs to be proposed by a first consensus node of a consortium blockchain and a first newest block hash maintained by the first consensus node, where the first newest block hash is a hash value of N blocks preceding a newest block in a distributed ledger maintained by the first consensus node, and N is a positive integer.

Some embodiments of this specification further provide a Byzantine fault tolerance algorithm-based blockchain consensus apparatus, including: a receiving module, configured to receive a consensus proposal initiated by a first consensus node of a consortium blockchain, where the consensus proposal includes a first proposal digest, the first proposal digest is generated based on a first newest block hash maintained by the first consensus node and a transaction set that needs to be proposed, the first newest block hash is a hash value of N blocks preceding a newest block in a distributed ledger maintained by the first consensus node, and N is a positive integer; a response module, configured to generate a second proposal digest in response to the consensus proposal based on a second newest block hash maintained by a second consensus node of the consortium blockchain and the transaction set, where the second newest block hash is a hash value of N blocks preceding a newest block in a distributed ledger maintained by the second consensus node, and N is a positive integer; and a processing module, configured to: skip consensus on the consensus proposal if the second consensus node determines that the first proposal digest does not match the second proposal digest; or otherwise, participate in consensus on the consensus proposal.

Some embodiments of this specification further provide an electronic device, including: a processor; and a memory, configured to store computer executable instructions, where the executable instructions, when executed, cause the processor to perform the following operation: initiating a consensus proposal, where the consensus proposal includes a first proposal digest, and the first proposal digest is generated based on a transaction set that needs to be proposed by a first consensus node of a consortium blockchain and a first newest block hash maintained by the first consensus node, where the first newest block hash is a hash value of N blocks preceding a newest block in a distributed ledger maintained by the first consensus node, and N is a positive integer.

Some embodiments of this specification further provide a computer-readable storage medium, storing a computer program, where the computer program, when executed by a processor, implements the following operation: initiating a consensus proposal, where the consensus proposal includes a first proposal digest, and the first proposal digest is generated based on a transaction set that needs to be proposed by a first consensus node of a consortium blockchain and a first newest block hash maintained by the first consensus node, where the first newest block hash is a hash value of N blocks preceding a newest block in a distributed ledger maintained by the first consensus node, and N is a positive integer.

Some embodiments of this specification further provide an electronic device, including: a processor; and a memory, configured to store computer executable instructions, where the executable instructions, when executed, cause the processor to perform the following operations: receiving a consensus proposal initiated by a first consensus node of a consortium blockchain, where the consensus proposal includes a first proposal digest, the first proposal digest is generated based on a first newest block hash maintained by the first consensus node and a transaction set that needs to be proposed, the first newest block hash is a hash value of N blocks preceding a newest block in a distributed ledger maintained by the first consensus node, and N is a positive integer; generating a second proposal digest in response to the consensus proposal based on a second newest block hash maintained by a second consensus node of the consortium blockchain and the transaction set, where the second newest block hash is a hash value of N blocks preceding a newest block in a distributed ledger maintained by the second consensus node, and N is a positive integer; and skipping consensus on the consensus proposal if the second consensus node determines that the first proposal digest does not match the second proposal digest; or otherwise, participating in consensus on the consensus proposal.

Some embodiments of this specification further provide a computer-readable storage medium, storing a computer program, where the computer program, when executed by a processor, implements the following operations: receiving a consensus proposal initiated by a first consensus node of a consortium blockchain, where the consensus proposal includes a first proposal digest, the first proposal digest is generated based on a first newest block hash maintained by the first consensus node and a transaction set that needs to be proposed, the first newest block hash is a hash value of N blocks preceding a newest block in a distributed ledger maintained by the first consensus node, and N is a positive integer; generating a second proposal digest in response to the consensus proposal based on a second newest block hash maintained by a second consensus node of the consortium blockchain and the transaction set, where the second newest block hash is a hash value of N blocks preceding a newest block in a distributed ledger maintained by the second consensus node, and N is a positive integer; and skipping consensus on the consensus proposal if the second consensus node determines that the first proposal digest does not match the second proposal digest; or otherwise, participating in consensus on the consensus proposal.

In some embodiments, a blockchain consensus method comprises: receiving, by a second consensus node of a blockchain, a consensus proposal initiated by a first consensus node of the blockchain, wherein the consensus proposal comprises a first proposal digest, and the first proposal digest is based on a transaction set that needs to be proposed and a first newest block hash maintained by the first consensus node; generating, by the second consensus node of the blockchain in response to the consensus proposal, a second proposal digest based on a second newest block hash maintained by the second consensus node and the transaction set; determining, by the second consensus node, whether the first proposal digest matches the second proposal digest; and participating, by the second consensus node, in consensus on the consensus proposal if the second consensus node determines that the first proposal digest matches the second proposal digest, or skipping, by the second consensus node, consensus on the consensus proposal if the second consensus node determines that the first proposal digest does not match the second proposal digest, wherein the first newest block hash and the second newest block hash are hash values of N blocks preceding newest blocks in distributed ledgers respectively maintained by the first consensus node and the second consensus node, and N is a positive integer.

In some embodiments, one or more non-transitory computer-readable storage media stores instructions executable by one or more processors, wherein execution of the instructions causes the one or more processors to perform operations comprising: receiving a consensus proposal initiated by a first consensus node of a blockchain, wherein the consensus proposal comprises a first proposal digest, and the first proposal digest is based on a transaction set that needs to be proposed and a first newest block hash maintained by the first consensus node; generating, in response to the consensus proposal, a second proposal digest based on a second newest block hash maintained by a second consensus node of the blockchain and the transaction set; determining whether the first proposal digest matches the second proposal digest; and participating in consensus on the consensus proposal if the second consensus node determines that the first proposal digest matches the second proposal digest, or skipping, by the second consensus node, consensus on the consensus proposal if the second consensus node determines that the first proposal digest does not match the second proposal digest, wherein the first newest block hash and the second newest block hash are hash values of N blocks preceding newest blocks in distributed ledgers respectively maintained by the first consensus node and the second consensus node, and N is a positive integer.

In some embodiments, a system comprises one or more processors and one or more non-transitory computer-readable memories coupled to the one or more processors and configured with instructions executable by the one or more processors to cause the system to perform operations comprising: receiving a consensus proposal initiated by a first consensus node of a blockchain, wherein the consensus proposal comprises a first proposal digest, and the first proposal digest is based on a transaction set that needs to be proposed and a first newest block hash maintained by the first consensus node; generating, in response to the consensus proposal, a second proposal digest based on a second newest block hash maintained by a second consensus node of the blockchain and the transaction set; determining whether the first proposal digest matches the second proposal digest; and participating in consensus on the consensus proposal if the second consensus node determines that the first proposal digest matches the second proposal digest, or skipping, by the second consensus node, consensus on the consensus proposal if the second consensus node determines that the first proposal digest does not match the second proposal digest, wherein the first newest block hash and the second newest block hash are hash values of N blocks preceding newest blocks in distributed ledgers respectively maintained by the first consensus node and the second consensus node, and N is a positive integer.

Some embodiments of this specification introduce a function of performing consensus on a newest block hash into a Byzantine fault tolerance algorithm-based consensus protocol, for a consensus node to determine whether the consensus node or a node initiating consensus has forked and decide whether to participate in consensus, thereby ensuring that nodes participating in consensus all perform consensus based on consistent newest block(s).

BRIEF DESCRIPTION OF THE DRAWINGS

Accompanying drawings described herein are used for providing further understanding of this specification, and constitute a part of this specification. Exemplary embodiments of this specification and descriptions thereof are used for explaining this specification, and do not constitute an inappropriate limitation on this specification. In the accompanying drawings.

DETAILED DESCRIPTION

To clearly state the objectives, technical solutions, and advantages of this specification, the technical solutions of this specification will be clearly and completely described below with reference to specific embodiments of this specification and corresponding accompanying drawings. Apparently, the described embodiments are merely some but not all of the embodiments of this specification. All other embodiments obtained by a person of ordinary skill in the art based on the embodiments of this specification without creative efforts shall fall within the protection scope of this file.

Based on the content stated in the background part, a consensus protocol can ensure that most nodes have the same transaction set after consensus, but cannot ensure that the nodes generate a consistent block based on an input of the same transaction set after transactions are executed. For example, when a new round of consensus is performed, if a preceding block forks, and neither a forked node nor a non-forked node can determine in time whether the node has forked and continues to participate in consensus, consistency of blocks generated by the nodes is further affected. Based on this, this specification provides a Byzantine fault tolerance algorithm-based blockchain consensus method, which introduces a function of performing consensus on the newest block hash into a consensus protocol, for a consensus node to determine in time whether the consensus node or a node initiating consensus forks and decide whether to participate in consensus, thereby ensuring that nodes participating in consensus all perform consensus based on consistent newest block(s).

The technical solutions provided in the embodiments of this specification are described in detail below with reference to the accompanying drawings.

Figure 1:
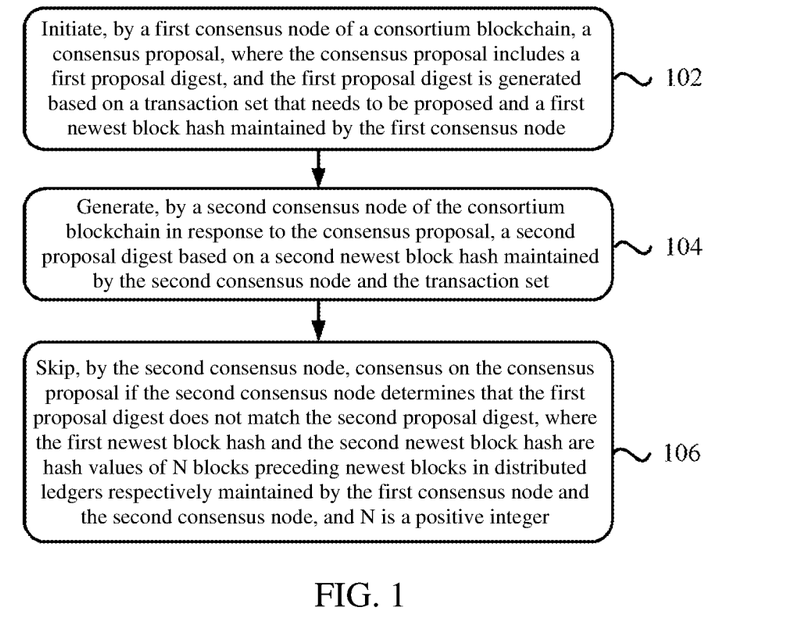
FIG. 1 is a schematic flowchart of a Byzantine fault tolerance algorithm-based blockchain consensus method, according to some embodiments of this specification.

FIG. 1 is a schematic flowchart of a Byzantine fault tolerance algorithm-based blockchain consensus method, according to some embodiments of this specification. Referring to FIG. 1, the method may include the following steps.

Step 102: Initiating, by a first consensus node of a consortium blockchain, a consensus proposal, where the consensus proposal includes a first proposal digest, and the first proposal digest is generated based on a transaction set that needs to be proposed and a first newest block hash maintained by the first consensus node.

Step 104: Generating, by a second consensus node of the consortium blockchain in response to the consensus proposal, a second proposal digest based on a second newest block hash maintained by the second consensus node and the transaction set.

The first consensus node is a node initiating a consensus proposal in the consortium blockchain, and the second consensus node is a node that may participate in consensus in the consortium blockchain. For example, in a consortium blockchain with a subordinate relationship, the first consensus node is a primary node, and the second consensus node is a backup node.

Step 106: Skipping, by the second consensus node, consensus on the consensus proposal if the second consensus node determines that the first proposal digest does not match the second proposal digest.

The first newest block hash and the second newest block hash are hash values of N blocks preceding newest blocks in distributed ledgers respectively maintained by the first consensus node and the second consensus node, and N is a positive integer.

In some embodiments, the newest block hash may be a hash value of a preceding block of the latest block. That is, the first newest block hash is a hash value of a preceding block of the latest block in the distributed ledger maintained by the first consensus node; and the second newest block hash is a hash value of a preceding block of the latest block in the distributed ledger maintained by the second consensus node.

An example of the newest block hash is shown in this embodiment of this specification herein. The newest block hash may be alternatively implemented in other manners, which is not limited in the embodiments of this application. Based on this, some embodiments of this specification introduce a preceding block of the latest block into a consensus proposal. A case that there is a fork between the preceding block and the latest block may be avoided based on adjacency between a hash value of the preceding block of the latest block and that of the latest block. In addition, consistency among preceding blocks can be ensured by verifying consistency of a hash value of the preceding block of the latest block, thereby reducing data volume required for matching.

The following describes an introduction manner of a newest block hash and a consensus process thereof in detail:

First, a consensus protocol agreement introduces the newest block hash data into a data structure of an existing consensus proposal, to generate a new proposal digest. Details may be as follows:

A first consensus node reads a hash value of a preceding block from a block header of the latest block in a distributed ledger maintained by the first consensus node, where the hash value is recorded as a first newest block hash; and then generates a first proposal digest based on the first newest block hash and a transaction set that needs to be proposed, and adds the first proposal digest to a consensus proposal.

After receiving the consensus proposal, a second consensus node reads a hash value of a preceding block from a block header of the latest block in a distributed ledger maintained by the second consensus node, where the hash value is recorded as a second newest block hash; then regenerates a proposal digest based on the second newest block hash and the transaction set that needs to be proposed and records the proposal digest as a second proposal digest; and detects whether the first proposal digest matches the second proposal digest, and if yes, participates in consensus on the consensus proposal, or otherwise, if the second consensus node determines that the first proposal digest does not match the second proposal digest, skips consensus on the consensus proposal.

The introduction manner of the newest block hash may be introducing the newest block hash as a calculation variable when the consensus protocol agreement modifies a calculation manner for a proposal digest in a preprepare message (that is, a proposal message) of a Practical Byzantine Fault Tolerance (PBFT) consensus algorithm, to generate a new proposal digest. Details may be as follows:

S1: Calculating a proposal digest.

The first consensus node determines a first transaction hash of the transaction set; and generates a first proposal digest based on the first transaction hash and the first newest block hash. Calculation logic thereof includes:

```
struct ConsensusDigest {
    Digest tx_root_hash;
    Digest newest_block_hash;
};
```

S2: Calculating a preprepare message.

A preprepare message is generated based on the first proposal digest and the transaction set and broadcast, to initiate a consensus proposal. An information format of the preprepare message is:

```
struct PrepareMessage {
    View v;
    Seq seq;
    Digest d; //proposal digest
    Batch batch; //various transaction sets
};
```

Similarly, after receiving the consensus proposal of the first consensus node, the second consensus node generates a second proposal digest based on a transaction hash of the transaction set and the second newest block hash according to the calculation manners of the proposal digest and the preprepare message; and finally compares the regenerated second proposal digest with the first proposal digest in the consensus proposal, and determines that the first newest block hash does not match the second newest block hash if the second consensus node determines that the second proposal digest does not match the first proposal digest. That is, the newest block of the second consensus node is inconsistent with the newest block of the first consensus node, and the second consensus node skips this consensus.

The first consensus node and the second consensus node may take a root hash of a Merkle tree as a root hash of the transaction set in a manner of calculating a Merkle tree of a transaction set. That is, the first transaction hash is a root hash value of a Merkle tree corresponding to the transaction set determined by the first consensus node; and the second transaction hash is a root hash value of a Merkle tree corresponding to the transaction set in the consensus proposal determined by the second consensus node.

An example of the introduction of a newest block hash is shown in this embodiment of this specification herein. The introduction of a newest block hash may be alternatively implemented in other manners, which is not limited in the embodiments of this application. Based on this, some embodiments of this specification use the newest block hash as a variable for calculating the proposal digest by modifying the calculation manner of the proposal digest, to combine the newest block hash into the consensus protocol. A modification degree of this manner to an existing framework is relatively small and convenient for promotion.

In addition, considering that the transaction set corresponding to the first transaction hash and the transaction set included in the consensus proposal may be inconsistent, this embodiment further provides a proposal digest calculation manner:

For the first proposal digest, the first consensus node first determines a transaction set (recorded as a first transaction set) and calculates a hash value (recorded as a first transaction hash) of the first transaction set; and then generates the first proposal digest based on the first newest block hash and the first transaction hash of the transaction set determined by the first consensus node.

In some embodiments, the first consensus node places the first transaction set in the consensus proposal and broadcasts the consensus proposal to other nodes, and the second consensus node may parse the consensus proposal to know that an object of the consensus proposal is the first transaction set. However, due to some abnormal cases, the transaction set included in the consensus proposal may not be the first transaction set and may be another transaction set (recorded as a second transaction set), and an object of the consensus proposal determined by the second consensus node is the second transaction set. Therefore, if the second consensus node uses the first transaction hash calculated by the first consensus node to calculate the second proposal digest, the second transaction set may be written into a block, and as a result a transaction set that the first consensus node expects to propose is inconsistent with a transaction set that is actually proposed.

In view of this, for the second proposal digest, the second consensus node first determines a transaction set that needs to be proposed and is included in the consensus proposal, then recalculates the second transaction hash of the transaction set in the consensus proposal, and generates the second proposal digest based on the second transaction hash of the transaction set in the consensus proposal and the second newest block hash.

An example of the proposal digest calculation manner is shown in this embodiment of this specification herein. In some embodiments, the proposal digest calculation manner may be alternatively implemented in other manners, which is not limited in the embodiments of this application. Based on this, in this embodiment of this specification, the first consensus node and the second consensus node respectively calculate proposal digests for transaction sets that need to be proposed and determined by the first consensus node and the second consensus node, to avoid that a transaction set that the first consensus node expects to propose is inconsistent with a transaction set that is actually proposed.

Further, if it is determined that the transaction set that the first consensus node expects to propose is inconsistent with the transaction set that is actually proposed, it indicates that this consensus proposal is abnormal, and nodes do not need to participate in this consensus. Therefore, before step 104 of generating a second proposal digest is performed, the consensus protocol may agree on writing the transaction hash into the consensus proposal or the proposal digest and performing a matching step of the transaction hash. By using an example in which the transaction hash is written into the proposal digest, the matching step of the transaction hash may be: writing, by the first consensus node, the first transaction hash into the first proposal digest, and matching, by the second consensus node after the second transaction hash is calculated based on the proposal digest calculation manner, the second transaction hash and the first transaction hash in the first proposal digest, where if the second consensus node determines that the first transaction hash does not match the second transaction hash, it indicates that the transaction set that the first consensus node expects to propose is inconsistent with the transaction set that is actually proposed, and the second consensus node skips consensus on the consensus proposal; or if the second consensus node determines that the first transaction hash matches the second transaction hash, it indicates that the transaction set that the first consensus node expects to propose is consistent with the transaction set that is actually proposed, and the second consensus node may continue to perform the step of generating a second proposal digest.

An example of the transaction hash matching step is shown in this embodiment of this specification herein. In some embodiments, the transaction hash matching step may be alternatively implemented in other manners, which is not limited in the embodiments of this application. Based on this, in this embodiment of this specification, the first transaction hash calculated by the first consensus node is written into the first proposal digest, to perform matching of dimensions of the transaction hashes of the transaction sets first before the second consensus node performs matching of dimensions of proposal digests, and determine, based on a matching result, whether the transaction set that the first consensus node expects to propose is consistent with the transaction set that is actually proposed, so as to further determine whether it is necessary to further perform matching of the dimensions of the proposal digests, thereby avoiding resource waste caused by unnecessary proposal digest matching.

Based on the above, some embodiments of this specification introduce a function of performing consensus on the newest block hash into a Byzantine fault tolerance algorithm-based consensus protocol, for a consensus node to determine whether the consensus node or a node initiating consensus has forked and decide whether to participate in consensus, thereby ensuring that nodes participating in consensus all perform consensus based on consistent newest block(s).

Figure 2:
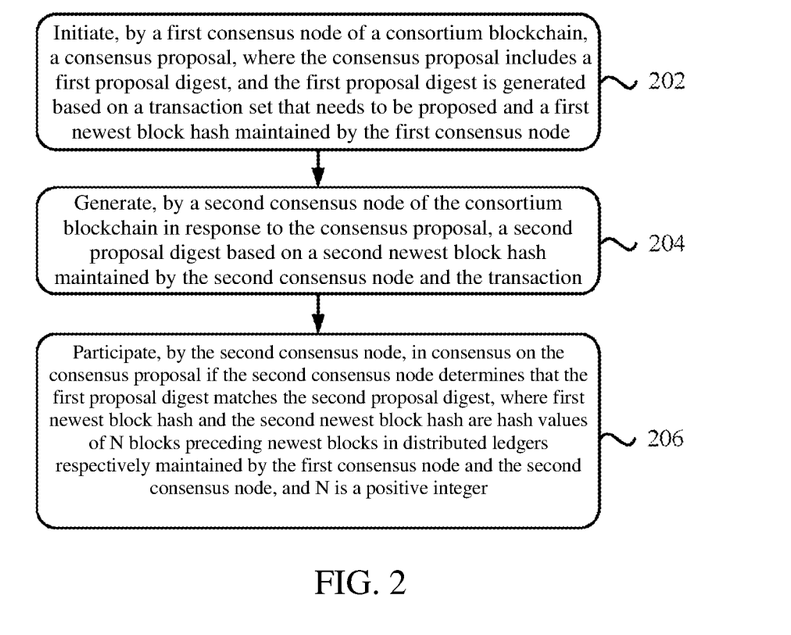
FIG. 2 is a schematic flowchart of a Byzantine fault tolerance algorithm-based blockchain consensus method, according to some embodiments of this specification.

FIG. 2 is a schematic flowchart of a Byzantine fault tolerance algorithm-based blockchain consensus method, according to some embodiments of this specification. Referring to FIG. 2, the method may include the following steps.

Step 202: Initiating, by a first consensus node of a consortium blockchain, a consensus proposal, where the consensus proposal includes a first proposal digest, and the first proposal digest is generated based on a transaction set that needs to be proposed and a first newest block hash maintained by the first consensus node.

Step 204: Generating, by a second consensus node of the consortium blockchain in response to the consensus proposal, a second proposal digest based on a second newest block hash maintained by the second consensus node and the transaction set.

Step 206: Participating, by the second consensus node, in consensus on the consensus proposal if the second consensus node determines that the first proposal digest matches the second proposal digest.

The first newest block hash and the second newest block hash are hash values of N blocks preceding newest blocks in distributed ledgers respectively maintained by the first consensus node and the second consensus node, and N is a positive integer.

Optionally, the first newest block hash is a hash value of a preceding block of the latest block in the distributed ledger maintained by the first consensus node; and the second newest block hash is a hash value of a preceding block of the latest block in the distributed ledger maintained by the second consensus node.

Optionally, the first proposal digest is generated based on the first newest block hash and a first transaction hash of the transaction set determined by the first consensus node; and the consensus proposal further includes a transaction set that needs to be proposed, and step 204 includes: generating the second proposal digest based on a second transaction hash of the transaction set in the consensus proposal and the second newest block hash.

Optionally, the first transaction hash is a root hash value of a Merkle tree corresponding to the transaction set determined by the first consensus node; and the second transaction hash is a root hash value of a Merkle tree corresponding to the transaction set in the consensus proposal determined by the second consensus node.

Optionally, the first proposal digest carries the first transaction hash, and before the generating a second proposal digest, the method further includes: skipping the consensus on the consensus proposal if the second consensus node determines that the first transaction hash does not match the second transaction hash; and continuing to perform the step of generating a second proposal digest if the second consensus node determines that the first transaction hash matches the second transaction hash.

Optionally, the method further includes: skipping, by the second consensus node, the consensus on the consensus proposal if the second consensus node determines that the first proposal digest does not match the second proposal digest.

Based on this, some embodiments of this specification introduce a function of performing consensus on a newest block hash into a Byzantine fault tolerance algorithm-based consensus protocol, for a node to determine whether the node or a node initiating consensus has forked and decide whether to participate in consensus, thereby ensuring that nodes participating in consensus all perform consensus based on consistent newest block(s).

Figure 3:
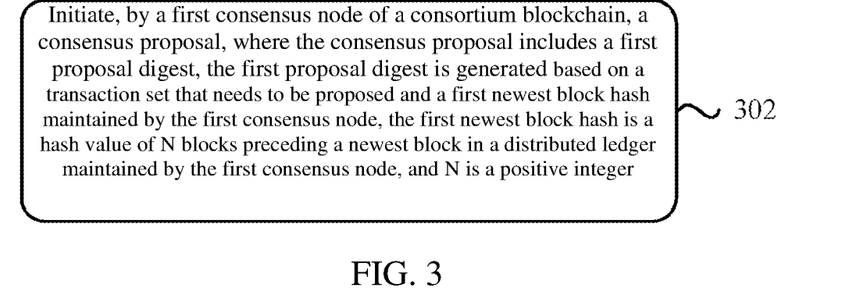
FIG. 3 is a schematic flowchart of a Byzantine fault tolerance algorithm-based blockchain consensus method, according to some embodiments of this specification.

FIG. 3 is a schematic flowchart of a Byzantine fault tolerance algorithm-based blockchain consensus method, according to some embodiments of this specification. The method may be performed by a first consensus node initiating a transaction consensus proposal in a consortium blockchain, and referring to FIG. 3, the method may include the following steps.

Step 302: Initiating, by a first consensus node of a consortium blockchain, a consensus proposal, where the consensus proposal includes a first proposal digest, and the first proposal digest is generated based on a transaction set that needs to be proposed and a first newest block hash maintained by the first consensus node.

The first newest block hash is a hash value of N blocks preceding a newest block in a distributed ledger maintained by the first consensus node, and N is a positive integer.

An example of step 302 is described in detail below:

Step S1: Determining a transaction set that needs to be proposed.

For example, a request initiated by a client is placed in a transaction pool, after confirming that transactions are successfully verified, the first consensus node selects a particular quantity of transactions from the transaction pool, where the transactions are recorded as a transaction set.

Step S2: Determining a first newest block hash maintained by the first consensus node, where the first newest block hash is a hash value of N blocks preceding a newest block in a distributed ledger maintained by the first consensus node, and N is a positive integer.

Figure 4:
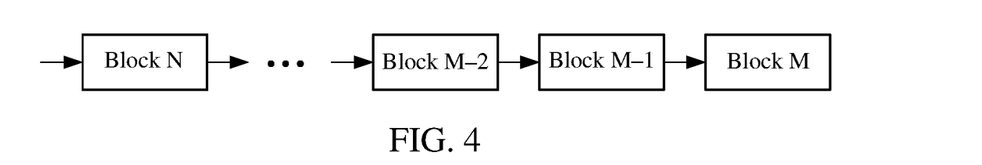
FIG. 4 is a schematic diagram of a distributed ledger maintained by a first consensus node, according to some embodiments of this specification.

For example, referring to FIG. 4, the distributed ledger maintained by the first consensus node includes a block 1, . . . , a block N, . . . , a block M−1, and a block M, where the block M is the latest generated block of the consortium blockchain, namely, the latest block maintained by the first consensus node. Correspondingly, the first newest block hash is a hash value of one or more nearest blocks before the block M.

Correspondingly, an implementation of step S2 may be: determining a hash value of a preceding block before the latest block maintained by the first consensus node; and using the hash value of the preceding block as the first newest block hash. That is, in this implementation, a hash value of a block nearest to the latest block, for example, the preceding block M−1 of the latest block M in FIG. 4, is selected, and the hash value of the block M−1 is used as the first newest block hash.

In other implementations of step S2, hashes of a plurality of nearest newest blocks may be alternatively used, for example, hashes of all blocks before the latest block are used, which is not limited herein.

Figure 5:
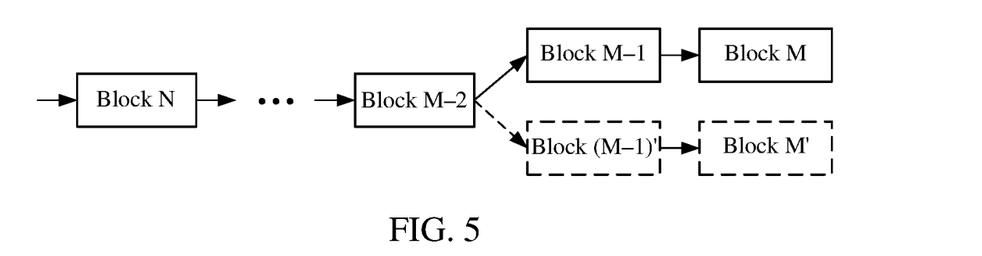
FIG. 5 is a schematic diagram of a distributed ledger maintained by a second consensus node, according to some embodiments of this specification.

Further, the reason why some embodiments of this specification introduce a newest block hash as a basis for determining whether a node forks lies in that newest block hashes of a forked node and a non-forked node are different. Referring to FIG. 5, the newest block hashes of a non-forked node are a block 1 to a block M−2 and a block M−1, and newest block hashes of a forked node are the block 1 to the block M−2 and a block (M−1)'. Apparently, a hash value of a newest block recorded in a block header of a block M is a hash value of the block M−1, a hash value of a newest block recorded in a block header of a block M' is a hash value of the block (M−1)', and the two hash values are different. Therefore, the newest block hash may be used as a basis for determining a forked node and a non-forked node.

An example of step S2 is shown in this embodiment of this specification herein. Step S2 may be alternatively implemented in other manners, which is not limited in the embodiments of this application. Based on this, in some embodiments of this specification, based on different characteristics of newest block hashes maintained by a forked node and a non-forked node, a hash value of one or more newest blocks before the latest block maintained by each node as the newest block hash, to determine whether the node or the node initiating consensus forks.

Step S3: Generating a proposal digest based on the transaction set and the first newest block hash, and initiating a consensus proposal. An implementation thereof may be: determining a first transaction hash of the transaction set; generating a proposal digest based on the first transaction hash and the first newest block hash; and generating and broadcasting a proposal message based on the proposal digest and the transaction set, to initiate a consensus proposal.

Specific calculation manners, specific data structures, and specific information formats of the proposal digest and the proposal message may be determined to adapt to a type of a blockchain and a type of a used consensus algorithm, which are not limited herein. For example, when a consensus primary node of a current consortium blockchain initiates a consensus proposal, a proposal message generally includes transactions verified by services of the consensus primary node. Based on some embodiments of this specification, a calculation manner of the proposal digest may be modified, to introduce the newest block hash into a calculation formula of the proposal digest.

In another feasible implementation of step S3, a transaction digest may be alternatively not modified based on a current proposal message, a data structure of the proposal message is modified, and the newest block hash is directly added to the consensus proposal.

An example of step S3 is shown in this embodiment of this specification herein. Step S3 may be alternatively implemented in other manners, which is not limited in the embodiments of this application. Based on this, according to the embodiments of this specification, on one hand, a newest block hash is introduced into a consensus protocol in a manner of modifying a transaction digest calculation manner or modifying the data structure of a consensus proposal, to avoid making improvement with a relatively great technical difficulty on the current consortium blockchain, which is easy to promote and has strong universality. On the other hand, consensus on the transaction hash of the transaction set is further introduced into the protocol. In this way, in a case that the transaction set proposed by the first consensus node and the digest do not correspond to those of the second consensus node, the second consensus node may refuse to participate in the consensus on the consensus proposal.

Optionally, the first consensus node may further write the first transaction hash into the first proposal digest, for the second consensus node to verify whether the transaction set corresponding to the first transaction hash and the transaction set included in the consensus proposal are consistent.

Based on the above, some embodiments of this specification introduce a function of performing consensus on a newest block hash into a consensus protocol, for a consensus node to determine in time whether the consensus node or a node initiating consensus has forked and decide whether to participate in consensus, to further ensure that nodes participating in consensus all perform consensus based on consistent newest block(s), thereby avoiding aggravating a block forking situation.

Figure 6:
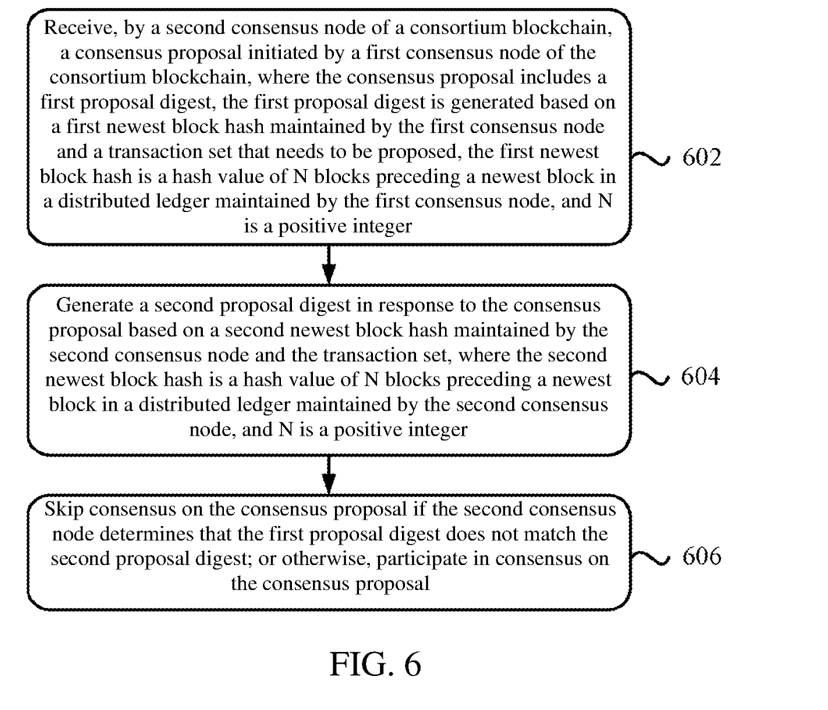
FIG. 6 is a schematic flowchart of a Byzantine fault tolerance algorithm-based blockchain consensus method, according to some embodiments of this specification.

FIG. 6 is a schematic flowchart of a Byzantine fault tolerance algorithm-based blockchain consensus method, according to some embodiments of this specification. The method may be performed by a second consensus node of a consortium blockchain. Referring to FIG. 6, the method may include the following steps.

Step 602: Receiving, by the second consensus node of the consortium blockchain, a consensus proposal initiated by a first consensus node of the consortium blockchain, where the consensus proposal includes a first proposal digest, the first proposal digest is generated based on a first newest block hash maintained by the first consensus node and a transaction set that needs to be proposed, the first newest block hash is a hash value of N blocks preceding a newest block in a distributed ledger maintained by the first consensus node, and N is a positive integer.

Step 604: Generating a second proposal digest in response to the consensus proposal based on a second newest block hash maintained by the second consensus node and the transaction set, where the second newest block hash is a hash value of N blocks preceding a newest block in a distributed ledger maintained by the second consensus node, and N is a positive integer.

For example, referring to FIG. 5, blocks in the consortium blockchain maintained by the second consensus node include a block 1, . . . , a block M−2, a block M−1, and a block M, where the block M is the latest generated block of the consortium blockchain, namely, the latest block maintained by the second consensus node. Correspondingly, the second newest block hash is a hash value of one or more newest blocks before the block M.

Correspondingly, an implementation of step 604 may be: determining a hash value of a preceding block of the latest block maintained by the second consensus node; and using the hash value of the preceding block as the second newest block hash. That is, in this implementation, a hash value of a block newest to the latest block, for example, the preceding block M−1 of the latest block M in FIG. 5, is selected from a plurality of newest blocks, and the hash value of the block M−1 is used as the second newest block hash.

In other implementations of step 604, hashes of a plurality of newest blocks may be alternatively used, for example, hashes of all blocks before the latest block are used, which is not limited herein. However, based on the consensus protocol agreement, the newest block selected by the first consensus node and the newest block selected by the second consensus node should correspond to each other, which includes the same quantities of selected newest blocks, the same corresponding identifiers in respective distributed ledgers of the selected newest blocks, and the like. For example, if the first consensus node selects all blocks before the latest block, the second consensus node may correspondingly select all blocks before the latest block. In another example, if the first consensus node only selects a preceding block of the latest block, the second consensus node may correspondingly select a preceding block of the latest block.

An example of step 604 is shown in this embodiment of this specification herein. Step 604 may be alternatively implemented in other manners, which is not limited in the embodiments of this application.

Step 606: Skipping consensus on the consensus proposal if the second consensus node determines that the first proposal digest does not match the second proposal digest; or otherwise, participating in consensus on the consensus proposal.

For example, the second consensus node parses the first proposal digest and the transaction set that needs to be proposed out of the proposal message; recalculates the second transaction hash of the transaction set, and generates the second proposal digest based on the second transaction hash and the second newest block hash maintained by the second consensus node; and detects whether the first proposal digest matches the second proposal digest. If the first proposal digest does not match the second proposal digest, the second consensus node determines one of the first consensus node and the second consensus node as a forked node and the other as a non-forked node, and refuses to participate in this consensus; or otherwise, the second consensus node determines that newest block results of the two nodes are the same and participates in this consensus.

Based on the above, some embodiments of this specification introduce a function of performing consensus on a newest block hash into a consensus protocol, for a consensus node to determine in time whether the consensus node or a node initiating consensus has forked and decide whether to participate in consensus, to further ensure that nodes participating in consensus all perform consensus based on consistent newest block(s), thereby avoiding aggravating a block forking situation.

Based on the same invention as the method embodiment corresponding to FIG. 1 or FIG. 2, a Byzantine fault tolerance algorithm-based blockchain consensus system is further provided, including a first consensus node and a second consensus node, where the first consensus node is configured to initiate a consensus proposal, where the consensus proposal includes a first proposal digest, and the first proposal digest is generated based on a transaction set that needs to be proposed and a first newest block hash maintained by the first consensus node; the second consensus node is configured to generate, in response to the consensus proposal, a second proposal digest based on a second newest block hash maintained by the second consensus node and the transaction set; and skipping consensus on the consensus proposal if the second consensus node determines that the first proposal digest does not match the second proposal digest; or otherwise, participating in consensus on the consensus proposal, where the first newest block hash and the second newest block hash are hash values of N blocks preceding newest blocks in distributed ledgers respectively maintained by the first consensus node and the second consensus node, and N is a positive integer.

Optionally, the first newest block hash is a hash value of a preceding block of the latest block in the distributed ledger maintained by the first consensus node; and the second newest block hash is a hash value of a preceding block of the latest block in the distributed ledger maintained by the second consensus node.

Optionally, the first proposal digest is generated based on the first newest block hash and a first transaction hash of the transaction set determined by the first consensus node; and the consensus proposal further includes a transaction set that needs to be proposed, and the generating a second proposal digest based on a second newest block hash maintained by the second consensus node and the transaction set includes: generating the second proposal digest based on a second transaction hash of the transaction set in the consensus proposal and the second newest block hash.

Optionally, the first transaction hash is a root hash value of a Merkle tree corresponding to the transaction set determined by the first consensus node; and the second transaction hash is a root hash value of a Merkle tree corresponding to the transaction set in the consensus proposal determined by the second consensus node.

Optionally, the first proposal digest carries the first transaction hash, before the second consensus node generates the second proposal digest, if the second consensus node determines that the first transaction hash does not match the second transaction hash, the second consensus node skips the consensus on the consensus proposal; or if the second consensus node determines that the first transaction hash matches the second transaction hash, the second consensus node continues to perform the step of generating a second proposal digest.

Optionally, the second consensus node participates in the consensus on the consensus proposal if the second consensus node determines that the first proposal digest matches the second proposal digest.

An interaction process between the first consensus node and the second consensus node of this system and a working principle thereof are described in detail in the foregoing embodiments. Therefore, these are not described herein again. Based on the above, this system introduces a function of performing consensus on a newest block hash into a consensus protocol, for a consensus node to determine in time whether the consensus node or a node initiating consensus has forked and decide whether to participate in consensus, to further ensure that nodes participating in consensus all perform consensus based on consistent newest block(s), thereby avoiding aggravating a block forking situation.

Figure 7:
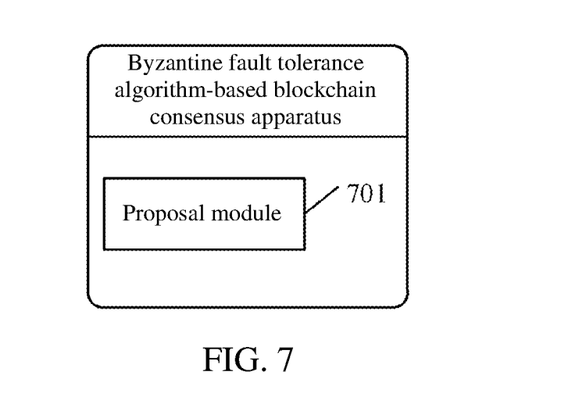
FIG. 7 is a schematic structural diagram of a Byzantine fault tolerance algorithm-based blockchain consensus apparatus, according to some embodiments of this specification.

FIG. 7 is a schematic structural diagram of a Byzantine fault tolerance algorithm-based blockchain consensus apparatus, according to some embodiments of this specification. Referring to FIG. 7, the apparatus may include: a proposal module 701, configured to initiate a consensus proposal, where the consensus proposal includes a first proposal digest, and the first proposal digest is generated based on a transaction set that needs to be proposed by a first consensus node of a consortium blockchain and a first newest block hash maintained by the first consensus node, where the first newest block hash is a hash value of N blocks preceding a newest block in a distributed ledger maintained by the first consensus node, and N is a positive integer.

The proposal module 701 includes: a first determining module, configured to determine the transaction set that needs to be proposed; a second determining module, configured to determine the first newest block hash maintained by the first consensus node of the consortium blockchain, where the first newest block hash is a hash value of N blocks preceding a newest block in a distributed ledger maintained by the first consensus node, and N is a positive integer; and a processing module, configured to: generate the first proposal digest based on the transaction set and the first newest block hash, and initiate a consensus proposal.

Optionally, the first newest block hash is a hash value of a preceding block of the latest block in the distributed ledger maintained by the first consensus node.

Optionally, the first proposal digest is generated based on the first newest block hash and a first transaction hash of the transaction set determined by the first consensus node; and the consensus proposal further includes a transaction set that needs to be proposed.

Optionally, the first transaction hash is a root hash value of a Merkle tree corresponding to the transaction set determined by the first consensus node.

Figure 8:
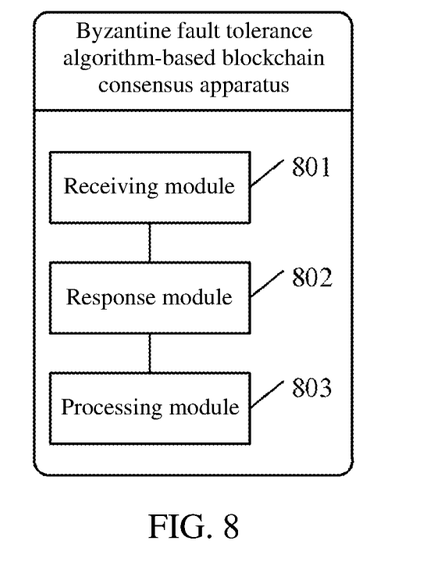
FIG. 8 is a schematic structural diagram of a Byzantine fault tolerance algorithm-based blockchain consensus apparatus, according to some embodiments of this specification.

FIG. 8 is a schematic structural diagram of a Byzantine fault tolerance algorithm-based blockchain consensus apparatus, according to some embodiments of this specification. Referring to FIG. 8, the apparatus may include: a receiving module 801, configured to receive a consensus proposal initiated by a first consensus node of a consortium blockchain, where the consensus proposal includes a first proposal digest, the first proposal digest is generated based on a first newest block hash maintained by the first consensus node and a transaction set that needs to be proposed, the first newest block hash is a hash value of N blocks preceding a newest block in a distributed ledger maintained by the first consensus node, and N is a positive integer; a response module 802, configured to generate a second proposal digest in response to the consensus proposal based on a second newest block hash maintained by a second consensus node of the consortium blockchain and the transaction set, where the second newest block hash is a hash value of N blocks preceding a newest block in a distributed ledger maintained by the second consensus node, and N is a positive integer; and a processing module 803, configured to: skip consensus on the consensus proposal if the second consensus node determines that the first proposal digest does not match the second proposal digest; or otherwise, participate in consensus on the consensus proposal.

Optionally, the second newest block hash is a hash value of a preceding block of the latest block in the distributed ledger maintained by the second consensus node.

Optionally, the response module 802 is configured to generate the second proposal digest based on a second transaction hash of the transaction set in the consensus proposal and the second newest block hash.

Optionally, the second transaction hash is a root hash value of a Merkle tree corresponding to the transaction set in the consensus proposal determined by the second consensus node.

Optionally, the first proposal digest carries the first transaction hash, and if the second consensus node determines that the first transaction hash does not match the second transaction hash, the response module 802 skips the consensus on the consensus proposal; or if the second consensus node determines that the first transaction hash matches the second transaction hash, the response module continues to perform the step of generating a second proposal digest.

Optionally, the processing module 803 participates in the consensus on the consensus proposal if the second consensus node determines that the first proposal digest matches the second proposal digest.

Since the apparatus embodiments corresponding to FIG. 7 and FIG. 8 are similar to the foregoing method embodiments, related content in the apparatus embodiments has been described in the method embodiments. Therefore, this is not described herein again. Based on the above, this system introduces a function of performing consensus on a newest block hash into a consensus protocol, for a consensus node to determine in time whether the consensus node or a node initiating consensus has forked and decide whether to participate in consensus, to further ensure that nodes participating in consensus all perform consensus based on consistent newest block(s), thereby avoiding aggravating a block forking situation. In addition, for various parts of the apparatus of this specification, logic division is performed on the parts according to functions to be implemented by the parts. However, this specification is not limited thereto, and the various parts may be divided again or combined as required.

Figure 9:
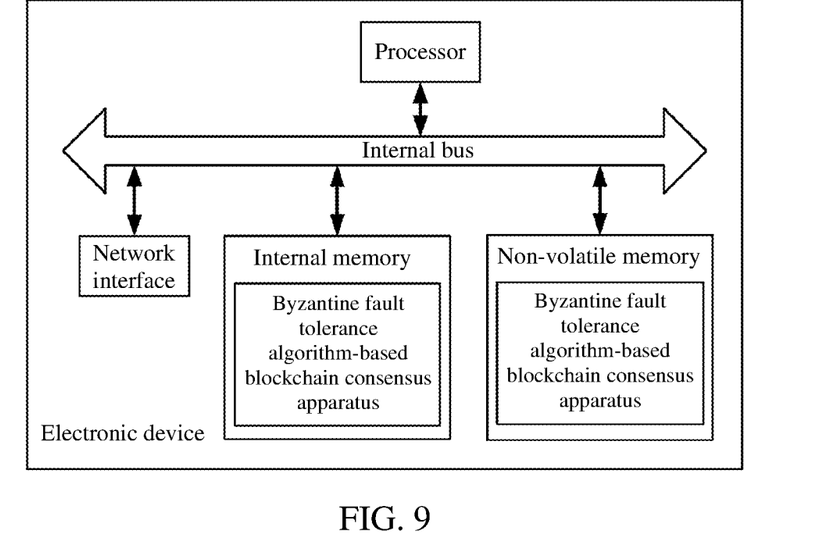
FIG. 9 is a schematic structural diagram of an electronic device, according to some embodiments of this specification.

FIG. 9 is a schematic structural diagram of an electronic device, according to some embodiments of this specification. Referring to FIG. 9, the electronic device includes a processor, an internal bus, a network interface, an internal memory, and a non-volatile memory, and may further include hardware required for other services. The processor reads a corresponding computer program from the non-volatile memory to the internal memory and then runs the computer program to form a Byzantine fault tolerance algorithm-based blockchain consensus apparatus at a logical level. Definitely, in addition to a software implementation, this specification does not exclude other implementations, for example, a logic device or a combination of software and hardware. In other words, an entity executing the following processing procedure is not limited to the logic units, and may also be hardware or logic devices.

The network interface, the processor, and the memory may be connected to each other through a bus system. The bus may be an industry standard architecture (ISA) bus, a peripheral component interconnect (PCI) bus, or an extended industry standard architecture (EISA) bus, or the like. The bus may be classified as an address bus, a data bus, a control bus, or the like. For ease of indication, only one bidirectional arrow is used for indication in FIG. 9, but it does not mean that there is only one bus or one type of bus.

The memory is configured to store a program. For example, the program may include program code, and the program code includes a computer operation instruction. The memory may include a read-only memory and a random access memory, and provide an instruction and data to the processor. The memory may include a high-speed random access memory, and may further include a non-volatile memory, such as at least one magnetic disk memory.

The processor is configured to execute the program stored in the memory and perform the following steps: initiating a consensus proposal, where the consensus proposal includes a first proposal digest, and the first proposal digest is generated based on a transaction set that needs to be proposed by a first consensus node of a consortium blockchain and a first newest block hash maintained by the first consensus node, where the first newest block hash is a hash value of N blocks preceding a newest block in a distributed ledger maintained by the first consensus node, and N is a positive integer; or, receiving a consensus proposal initiated by a first consensus node of a consortium blockchain, where the consensus proposal includes a first proposal digest, the first proposal digest is generated based on a first newest block hash maintained by the first consensus node and a transaction set that needs to be proposed, the first newest block hash is a hash value of N blocks preceding a newest block in a distributed ledger maintained by the first consensus node, and N is a positive integer; generating a second proposal digest in response to the consensus proposal based on a second newest block hash maintained by a second consensus node of the consortium blockchain and the transaction set, where the second newest block hash is a hash value of N blocks preceding a newest block in a distributed ledger maintained by the second consensus node, and N is a positive integer; and skipping consensus on the consensus proposal if the second consensus node determines that the first proposal digest does not match the second proposal digest; or otherwise, participating in consensus on the consensus proposal.

The foregoing method performed by the Byzantine fault tolerance algorithm-based blockchain consensus apparatus and disclosed in the embodiments shown in FIG. 7 and FIG. 8 of this specification or a primary node may be applicable to the processor or implemented by the processor. The processor may be an integrated circuit chip, and has a signal processing capability. During implementation, the steps of the foregoing method may be completed through an integrated logic circuit of hardware or an instruction in the form of software in the processor. The foregoing processor may be a general-purpose processor, including a central processing unit (CPU), a network processor (NP), or the like; and may further be a digital signal processor (DSP), an application specific integrated circuit (ASIC), a field-programmable gate array (FPGA), or another programmable logic device, a discrete gate or a transistor logic device, or a discrete hardware component. The methods, steps, and logical block diagrams disclosed in the embodiments of this specification may be implemented or performed. The general-purpose processor may be a microprocessor, or the processor may be any conventional processor or the like. The steps of the method disclosed in combination with the embodiments of this specification may be directly embodied as being performed by a hardware decoding processor, or performed by a combination of hardware and software modules in the decoding processor. The software module may be stored in a storage medium that is mature in the art, such as a random access memory (RAM), a flash memory, a read-only memory (ROM), a programmable ROM, an electrically erasable programmable memory, or a register. The storage medium is located in the memory. The processor reads information in the memory and completes the steps of the methods in combination with hardware thereof.

The Byzantine fault tolerance algorithm-based blockchain consensus apparatus may further perform the methods of FIG. 1 to FIG. 6, and implements the method performed by the primary node.

Based on the same invention, some embodiments of this specification further provide a computer-readable storage medium, storing one or more programs, the one or more programs, when executed by electronic devices of a plurality of application programs, cause the electronic devices to perform the Byzantine fault tolerance algorithm-based blockchain consensus method according to the embodiments corresponding to FIG. 1 to FIG. 6.

The embodiments of this specification are all described in a progressive manner, for same or similar parts in the embodiments, refer to these embodiments, and descriptions of each embodiment focus on a difference from other embodiments. Especially, a system embodiment is basically similar to a method embodiment, and therefore is described briefly; for related parts, reference may be made to partial descriptions in the method embodiment.

Embodiments of this specification are described above. Other embodiments fall within the scope of the appended claims. In some embodiments, the actions or steps recorded in the claims may be performed in sequences different from those in the embodiments and an expected result may still be achieved. In addition, the processes depicted in the accompanying drawings is not necessarily performed in the specific order or successively to achieve an expected result. In some implementations, multitasking and parallel processing may be feasible or beneficial.

A person skilled in the art should understand that the embodiments of this specification may be provided as a method, a system, or a computer program product. Therefore, this specification may use a form of hardware only embodiments, software only embodiments, or embodiments with a combination of software and hardware. Moreover, this specification may use a form of a computer program product that is implemented on one or more computer-usable storage media (including but not limited to a disk memory, a CD-ROM, an optical memory, and the like) that include computer-usable program code.

This specification is described with reference to the flowcharts and/or block diagrams of the method, the device (system), and the computer program product according to the embodiments of this specification. Computer program instructions can implement each procedure and/or block in the flowcharts and/or block diagrams and a combination of procedures and/or blocks in the flowcharts and/or block diagrams. These computer program instructions may be provided to a general-purpose computer, a special-purpose computer, an embedded processor, or a processor of another programmable data processing device to generate a machine, for an apparatus configured to implement functions specified in one or more procedures in the flowcharts and/or one or more blocks in the block diagrams to be generated by using instructions executed by the computer or the processor of another programmable data processing device.

These computer program instructions may alternatively be stored in a computer-readable memory that can instruct a computer or another programmable data processing device to work in a specific manner, for the instructions stored in the computer-readable memory to generate an artifact that includes an instruction apparatus. The instruction apparatus implements a specific function in one or more procedures in the flowcharts and/or in one or more blocks in the block diagrams.

These computer program instructions may further be loaded onto a computer or another programmable data processing device, for a series of operations and steps to be performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a computing device includes one or more processors (CPUs), an input/output (I/O) interface, a network interface, and an internal memory.

The internal memory may include a form such as a volatile memory, a random-access memory (RAM) and/or a non-volatile memory such as a read-only memory (ROM) or a flash RAM in a computer-readable medium. The internal memory is an example of the computer-readable medium.

The computer-readable medium includes a non-volatile medium and a volatile medium, a removable medium and a non-removable medium, which may implement storage of information by using any method or technology. The information may be a computer-readable instruction, a data structure, a program module, or other data. Examples of a storage medium of a computer includes, but is not limited to, a phase-change memory (PRAM), a static random access memory (SRAM), a dynamic random access memory (DRAM), or other types of random access memory (RAM), a read-only memory (ROM), an erasable programmable read-only memory (EEPROM), a flash memory or another storage technology, a compact disc read-only memory (CD-ROM), a digital versatile disc (DVD) or another optical storage, a cartridge tape, a magnetic tape, a magnetic disk storage or another magnetic storage device, or any other non-transmission medium, which may be configured to store information accessible by a computing device. According to limitations of this specification, the computer-readable medium does not include transitory computer-readable media, such as a modulated data signal and a modulated carrier.

It should be further noted that the terms "comprise," "include," or any variants thereof are intended to cover a non-exclusive inclusion. Therefore, a process, method, article, or device that includes a series of elements not only includes such elements, but also includes other elements not specified expressly, or may include inherent elements of the process, method, article, or device. Unless otherwise specified, an element limited by "include a/an . . . " does not exclude other same elements existing in the process, the method, the article, or the device that includes the element.

A person skilled in the art should understand that the embodiments of this specification may be provided as a method, a system, or a computer program product. Therefore, this specification may use a form of hardware only embodiments, software only embodiments, or embodiments with a combination of software and hardware. Moreover, this specification may use a form of a computer program product that is implemented on one or more computer-usable storage media (including but not limited to a disk memory, a CD-ROM, an optical memory, and the like) that include computer-usable program code.

The descriptions are merely embodiments of this application, and are not intended to limit this application. For a person skilled in the art, various modifications and changes may be made to this specification. Any modification, equivalent replacement, and improvement made within the spirit and principle of this specification shall fall within the scope of the claims of this specification.

What is claimed is:

1. A blockchain consensus method, comprising:
determining, by each of one or more backup nodes of a plurality of consensus nodes, that a blockchain maintained by the plurality of consensus nodes based on a Practical Byzantine Fault Tolerance (PBFT) consensus algorithm has not forked;
in response to the determination, participating, by the backup node, in a consensus with a primary node of the plurality of consensus nodes to add a new block to the blockchain;
determining, by the backup node, a second newest block hash of the blockchain including the added the new block;
receiving, by the backup node, a consensus proposal initiated by the primary node of the plurality of consensus nodes for adding at least a transaction set into the blockchain in a different new block, wherein the consensus proposal comprises a first proposal digest, and the first proposal digest is based on the transaction set and a first newest block hash maintained by the primary node;
generating, by the backup node in response to the consensus proposal, a second proposal digest based on the second newest block hash and the transaction set;
determining, by the backup node, whether the first proposal digest matches the second proposal digest;
when determining that the first proposal digest matches the second proposal digest:
determining, by the backup node, that the blockchain has not forked, and
participating, by the backup node, in consensus on the consensus proposal to ensure that the backup nodes and the primary node participating in the consensus perform the consensus consistently based on the different new block;
when determining that the first proposal digest does not match the second proposal digest:
determining, by the backup node, that the blockchain has forked, and
skipping, by the backup node, consensus on the consensus proposal to avoid wasting computing resources on proposal digest matching; and
wherein the first newest block hash and the second newest block hash are hash values of N blocks preceding newest blocks in distributed ledgers of the blockchain respectively maintained by the primary node and the backup node, and N is a positive integer.

2. The method according to claim 1, wherein:
the first newest block hash is a hash value of a preceding block of a newest block in a distributed ledger of the blockchain maintained by the primary node; and
the second newest block hash is a hash value of a preceding block of a newest block in a distributed ledger of the blockchain maintained by the backup node.

3. The method according to claim 1, wherein the first proposal digest is generated based on the first newest block hash and a first transaction hash of the transaction set determined by the primary node.

4. The method according to claim 3, wherein:
the consensus proposal further comprises the transaction set, and the generating a second proposal digest based on the second newest block hash and the transaction set comprises:
generating the second proposal digest based on a second transaction hash of the transaction set in the consensus proposal and the second newest block hash.

5. The method according to claim 4, wherein:
the first transaction hash is a root hash value of a Merkle tree corresponding to the transaction set determined by the primary node; and
the second transaction hash is a root hash value of a Merkle tree corresponding to the transaction set in the consensus proposal determined by the backup node.

6. The method according to claim 4, wherein the first proposal digest carries the first transaction hash, and before the generating a second proposal digest, the method further comprises:
determines whether the first transaction hash matches the second transaction hash; and
continuing to perform the step of generating a second proposal digest if the backup node determines that the first transaction hash matches the second transaction hash, or skipping the consensus on the consensus proposal if the backup node determines that the first transaction hash does not match the second transaction hash.

7. The method according to claim 1, wherein the receiving, by the backup node, a consensus proposal comprises:
obtaining, by the backup node from a preprepare message broadcast by the primary node, the consensus proposal.

8. One or more non-transitory computer-readable storage media storing instructions executable by one or more processors, wherein execution of the instructions causes the one or more processors to perform operations comprising:
determining that a blockchain maintained by a plurality of consensus nodes based on a Practical Byzantine Fault Tolerance (PBFT) consensus algorithm has not forked, wherein the plurality of consensus nodes comprise a primary node and a plurality of backup nodes;
in response to the determination, participating in a consensus with the primary node to add a new block to the blockchain;
determining a second newest block hash of the blockchain including the added the new block;
receiving a consensus proposal initiated by the primary node of the plurality of consensus nodes for adding at least a transaction set into the blockchain in a different new block, wherein the consensus proposal comprises a first proposal digest, and the first proposal digest is based on the transaction set and a first newest block hash maintained by the primary node;
generating, in response to the consensus proposal, a second proposal digest based on the second newest block hash and the transaction set;
determining whether the first proposal digest matches the second proposal digest;
when determining that the first proposal digest matches the second proposal digest:
determining that the blockchain has not forked, and
participating in consensus on the consensus proposal to ensure that the backup nodes and the primary node participating in the consensus perform the consensus consistently based on the different new block;
when determining that the first proposal digest does not match the second proposal digest:

determining that the blockchain has forked, and
skipping consensus on the consensus proposal to avoid wasting computing resources on proposal digest matching; and
wherein the first newest block hash and the second newest block hash are hash values of N blocks preceding newest blocks in distributed ledgers of the blockchain respectively maintained by the primary node and one of the backup nodes, and N is a positive integer.

9. The one or more non-transitory computer-readable storage media according to claim 8, wherein:
the first newest block hash is a hash value of a preceding block of a newest block in a distributed ledger of the blockchain maintained by the primary node; and
the second newest block hash is a hash value of a preceding block of a newest block in a distributed ledger of the blockchain maintained by the backup node.

10. The one or more non-transitory computer-readable storage media according to claim 8, wherein the first proposal digest is generated based on the first newest block hash and a first transaction hash of the transaction set determined by the primary node.

11. The one or more non-transitory computer-readable storage media according to claim 10, wherein:
the consensus proposal further comprises the transaction set, and the generating a second proposal digest based on the second newest block hash and the transaction set comprises:
generating the second proposal digest based on a second transaction hash of the transaction set in the consensus proposal and the second newest block hash.

12. The one or more non-transitory computer-readable storage media according to claim 11, wherein:
the first transaction hash is a root hash value of a Merkle tree corresponding to the transaction set determined by the primary node; and
the second transaction hash is a root hash value of a Merkle tree corresponding to the transaction set in the consensus proposal determined by the backup node.

13. The one or more non-transitory computer-readable storage media according to claim 11, wherein the first proposal digest carries the first transaction hash, and before the generating a second proposal digest, the operations further comprises:
determines whether the first transaction hash matches the second transaction hash; and
continuing to perform the step of generating a second proposal digest if the backup node determines that the first transaction hash matches the second transaction hash, or skipping the consensus on the consensus proposal if the backup node determines that the first transaction hash does not match the second transaction hash.

14. The one or more non-transitory computer-readable storage media according to claim 8, wherein the receiving, by the backup node, a consensus proposal comprises:
obtaining, by the backup node from a preprepare message broadcast by the primary node, the consensus proposal.

15. A system comprising one or more processors and one or more non-transitory computer-readable memories coupled to the one or more processors and configured with instructions executable by the one or more processors to cause the system to perform operations comprising:
determining that a blockchain maintained by a plurality of consensus nodes based on a Practical Byzantine Fault Tolerance (PBFT) consensus algorithm has not forked, wherein the plurality of consensus nodes comprise a primary node and a plurality of backup nodes;
in response to the determination, participating in a consensus with the primary node to add a new block to the blockchain;
determining a second newest block hash of the blockchain including the added the new block;
receiving a consensus proposal initiated by the primary node of the plurality of consensus nodes for adding at least a transaction set into the blockchain in a different new block, wherein the consensus proposal comprises a first proposal digest, and the first proposal digest is based on the transaction set and a first newest block hash maintained by the primary node;
generating, in response to the consensus proposal, a second proposal digest based on the second newest block hash maintained by the second consensus node and the transaction set;
determining whether the first proposal digest matches the second proposal digest;
when determining that the first proposal digest matches the second proposal digest:
determining that the blockchain has not forked, and
participating in consensus on the consensus proposal to ensure that the backup nodes and the primary node participating in the consensus perform the consensus consistently based on the different new block;
when determining that the first proposal digest does not match the second proposal digest:
determining that the blockchain has forked, and
skipping consensus on the consensus proposal to avoid wasting computing resources on proposal digest matching; and
wherein the first newest block hash and the second newest block hash are hash values of N blocks preceding newest blocks in distributed ledgers of the blockchain respectively maintained by the primary node and one of the backup nodes, and N is a positive integer.

16. The system according to claim 15, wherein:
the first newest block hash is a hash value of a preceding block of a newest block in a distributed ledger of the blockchain maintained by the primary node; and
the second newest block hash is a hash value of a preceding block of a newest block in a distributed ledger of the blockchain maintained by the backup node.

17. The system according to claim 15, wherein the first proposal digest is generated based on the first newest block hash and a first transaction hash of the transaction set determined by the primary node.

18. The system according to claim 17, wherein:
the consensus proposal further comprises the transaction set, and the generating a second proposal digest based on the second newest block hash and the transaction set comprises:
generating the second proposal digest based on a second transaction hash of the transaction set in the consensus proposal and the second newest block hash.

19. The system according to claim 18, wherein:
the first transaction hash is a root hash value of a Merkle tree corresponding to the transaction set determined by the primary node; and
the second transaction hash is a root hash value of a Merkle tree corresponding to the transaction set in the consensus proposal determined by the backup node.

20. The system according to claim 18, wherein the first proposal digest carries the first transaction hash, and before the generating a second proposal digest, the operations further comprises:
- skipping the consensus on the consensus proposal if the backup node determines that the first transaction hash does not match the second transaction hash; or
- continuing to perform the step of generating a second proposal digest if the backup node determines that the first transaction hash matches the second transaction hash.

* * * * *